United States Patent Office 3,342,217
Patented Sept. 19, 1967

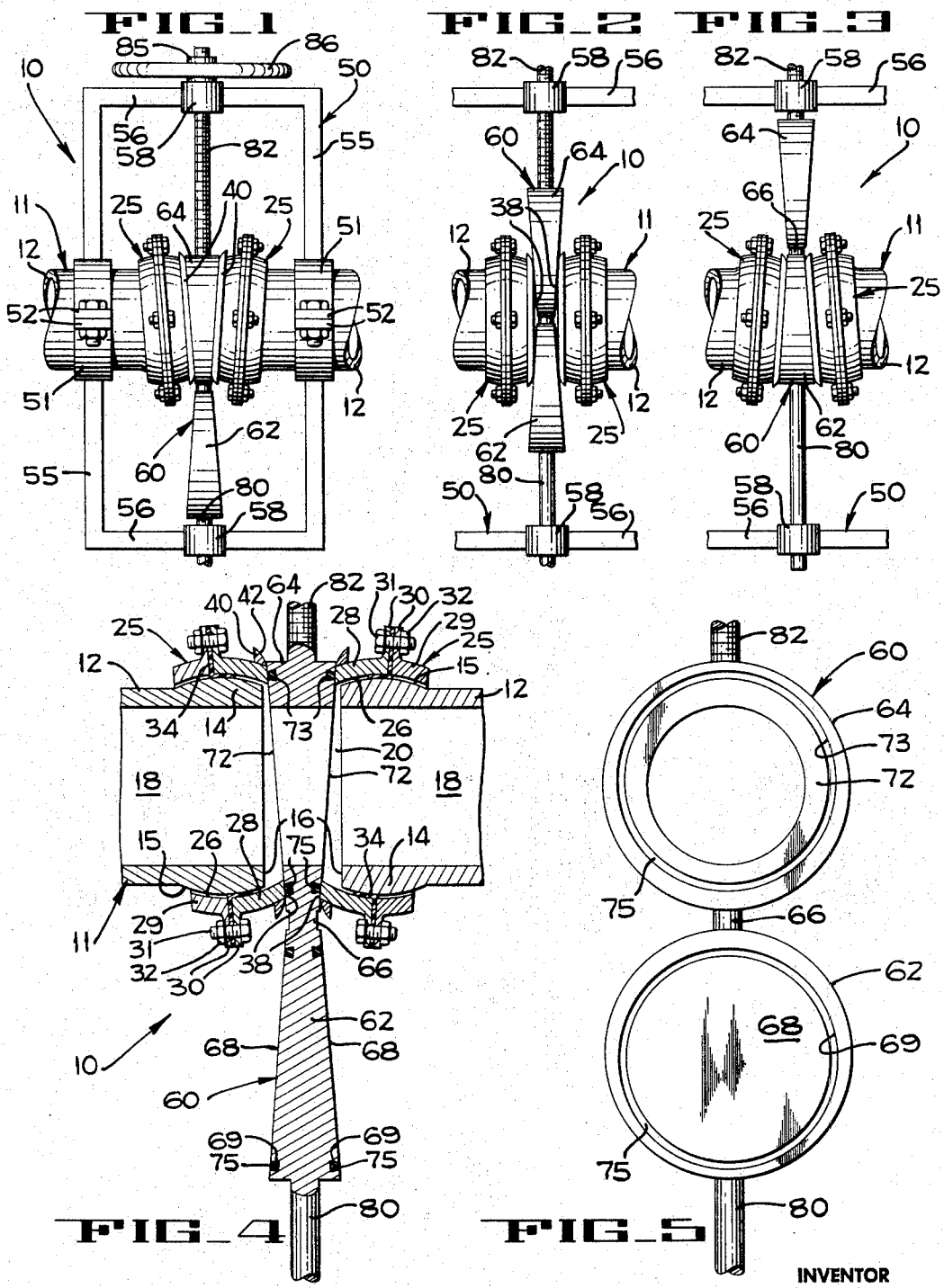

3,342,217
FLOW CONTROLLING APPARATUS
Warren N. Low, Bethesda, Md., assignor to FMC Corporation, San Jose, Calif., a corporation of California
Filed Feb. 12, 1965, Ser. No. 432,142
6 Claims. (Cl. 138—94.3)

ABSTRACT OF THE DISCLOSURE

A line blind in which the flow line is sealed to the spectacle plate by a pair of collars that are angularly adjusted automatically by rectilinear movement of the spectacle plate.

---

The present invention pertains to flow controlling apparatus and more particularly to a line blind in which movement of the flow controlling portions of a valve member automatically effects seating of said portions in the blind.

Previous line blinds have used relatively complicated mechanical structures requiring excessive manipulation in order to change the valve member or spectacle plate between open and closed positions. For example, certain of the prior blinds require axial unclamping of the spectacle plate, manual pivoting of the plate through 180°, reseating of the opposite end portion of the plate, and reclamping of the plate. Other types of line blinds utilize a separate wedge element for maintaining the spectacle plate in a seated position, it being required, of course, to loosen and tighten this wedge element each time it is desired to change the position of the plate.

It is an object of the present invention to provide flow controlling apparatus in which movement of a valve member into flow controlling position angularly adjusts a sealing collar against the valve member.

Another object is to provide a line blind in which movement of the flow controlling portions of a valve member automatically effects seating of said portions in the blind.

Another object is to provide a line blind in which a wedging action is utilized for effecting self seating of each flow controlling portion of a spectacle plate.

Another object is to provide a line blind in which adjustment of the spectacle plate between its alternate positions may be effected solely by rectilinear movement of the plate.

Another object is to provide a line blind which obviates the necessity of clamping and unclamping parts of the blind and inversion of the spectacle plate in order to change the position of the plate in the blind.

Another object is to provide a line blind in which the mounting and adjusting structure for the spectacle plate can be oriented in various positions around the conduit with which the blind is associated.

Another object is to minimize the time, labor and expense involved in changing the position of a line blind.

These, together with other objects will become apparent with reference to the following description and accompanying drawings, in which:

FIGURE 1 is a side elevation of a line blind mounted on a conduit and embodying the present invention.

FIGURE 2 is a fragmentary side elevation of the blind and shows the spectacle plate in a neutral position.

FIGURE 3 is a view similar to FIGURE 2 but shows the spectacle plate in the alternate position from that shown in FIGURE 1.

FIGURE 4 is an enlarged fragmentary section of the line blind and conduit with the spectacle plate in the same position as shown in FIGURE 1.

FIGURE 5 is a face view of the spectacle plate and shows portions of the mounting stems attached thereto.

Referring more particularly to the drawing, the line blind of the present invention is generally indicated by the numeral 10 and is mounted in a conduit 11 having a pair of aligned, axially spaced conduit sections 12 (FIG. 4). Each conduit section includes an enlarged mounting portion 14 having an annular convex surface 15 and terminating in an annular end edge 16. The conduit provides a flow passage 18 through the sections, and the spaced sections define a gap 20 disposed transversely of said flow passage.

The line blined 10 also includes sealing collars 25 having concave sockets 26 complementarily receiving the mounting portions 14 of the conduit sections 12. Each collar includes front and rear segments 28 and 29 having outwardly projecting mating flanges 30 which are interconnected by bolts 31 and nuts 32. Annular gaskets 34 provide inner flanges between the convex surfaces 15 of the mounting portions and the concave sockets of the collars and outer flanges clamped between the flanges 30 of the segments; the gaskets may be of Teflon or similar sealing material having a low coefficient of friction. The front segments of the collars have annular inner edges 38 and annular camming lips 40 projecting outward adjacent to the inner edges 38, and lips having convex surfaces 42.

It will be understood that the collars 25 are mounted on the portions 14 of the conduit sections 12 for swiveling movement between a neutral position (FIG. 2) with the inner edges 38 substantially parallel to each other and seating positions (FIGS. 1, 3, and 4) with said inner edges in non-parallel or oblique relation to each other. During such swiveling movement, the gaskets 34 maintain a fluid tight seal between the mounting portions and the collars.

A rectangular frame 50 is mounted on the conduit 11 by semi-circular split clamps 51 including bolted flanges 52. The frame has radial legs 55 projecting outward from opposite sides of each clamp and axial legs 56 interconnecting the radial legs on opposite sides of the conduit. Bearings 58 are mounted in the axial legs in substantially the same plane as the gap 20 and are in axial alignment with each other. By loosening the clamps 51, the entire frame can be rotated 360° about the axis of the flow passage 18 and by tightening the clamps, the frame can be adjusted into any position circumferentially of the conduit.

The subject blind 10 is also provided with a valve or spectacle plate 60 including blind and open flow controlling portions 62 and 64, respectively, interconnected by an intermediate stem 66. The blind portion has opposite obliquely related annular faces 68 in which are provided annular grooves 69. Similarly, the open portion provides opposite obliquely related annular faces 72 in which are provided annular grooves 73. O-rings 75 are disposed in each of the grooves 69 and 73. The opposite faces 68 or 72 of the flow controlling portions diverge outward from the stem 66, it being noted that the flow controlling portions are identical in size and shape, with their respective opposite faces having the same angular relation to each other.

The valve plate 60 is located in the plane of the gap 20. A smooth stem 80 projects from the blind flow controlling portion 62 in axial alignment with the intermediate stem 66 and into one of the bearings 58 of the frame 50. A threaded stem 82 projects from the open flow controlling portion 64, also in axial alignment with the smooth and intermediate stems through the other bearing of the frame. A nut 85 is rotatably mounted in the bearing through which the threaded stem passes and threadably receives the threaded stem. A hand wheel 86 circumscribes and is connected to the nut for rotating the same in order to move the valve plate in the plane of the gap 20, it being noted that the plate has only rectilinear motion.

In operation, let it be assumed that the collars 25 are in their neutral positions, as illustrated in FIG. 2, at which time the intermediate stem 66 of the valve plate 60 is located approximately on the axis of the flow passage 18. If it is then desired to open the blind 10, the hand wheel 86 is turned so as to move the open flow controlling portion 64 into a seated position. Comparing FIG. 2 with FIG. 1, it will be noted that movement of the open portion 64 transversely inwardly of the gap 20 will cause the opposite faces 68 to force the inner edges 38 away from each other at the top and toward each other at the bottom, as viewed in FIGS. 1 and 2. When the open flow control portion is in alignment with the flow passage 18 (FIGS. 1 and 4), the inner edges 38 of the collars 25 are in circumferential engagement with the opposite faces 72 of the open portion and, more specifically, in sealing engagement with the O-rings 75.

If it is then desired to move the line blind 10 into a closed position (FIG. 3), the hand wheel 86 is rotated in the opposite direction in order to move the valve plate 60 in the opposite direction so as to shift the open flow controlling portion 64 out of the gap 20 and to shift the blind flow controlling portion 62 into the gap. With reference to FIGS. 1 and 3, it will be evident that this movement causes the opposite faces 68 of the blind portion 62 to bear against the inner edges 38 causing them to separate at the bottom and move together at the top until the blind portion is fully seated, as viewed in FIG. 3, with the inner edges 38 in circumferential engagement with the O-rings 75 in the blind portion. During initial entry of either the blind or open portion 62 or 64 into the gap 20, the faces engage the camming lips 40 which facilitate such entry. For this purpose, the edges of the faces 68 and 72 are preferably rounded or radiused for camming engagement with the lips 40.

From the foregoing, it will be understood that the subject line blind effects automatic seating of either the blind or open portions of the valve plate simply by rectilinear movement of the plate in the gap between the conduit sections. Because of this construction, the plate can be changed in position in a minimum of time and effort and with a minimum of wear of the mating parts. Because of the swivel mounting of the collar 25 on the conduit section 12, the latter can be connected in a conduit or other flow line without regard to angular orientation. Still further, this swivel mounting together with the angular adjustability of the frame 50 enables adjustment of rectilinear path of movement of the valve plate into any position throughout a 360° range.

Although a preferred embodiment of the present invention has been shown and described, it will be understood that various changes and modifications may be made in the details thereof without departing from the spirit and scope of the appended claims.

Having thus described the invention, what is claimed as new and desired to be secured by Letters Patent is:

1. A line blind comprising conduit means having an axial flow passage and a pair of axially spaced mounting portions defining a gap disposed transversely of said flow passage, collars circumscribing said mounting portions and having annular inner edges, said collars being swivelly mounted on said mounting portions for movement between a neutral position with said inner edges substantially parallel and seating positions with said inner edges obliquely related to each other, each collar having front and rear segments cooperating to retain said collar on its mounting portion, said segments being releasably interconnected to facilitate installation and removal of said collar on and from its mounting portion, each collar also having an annular arcuate camming lip extending radially outward from its inner edge, annular sealing means mounted on each collar and providing a fluid-type seal between said collar and said mounting portions, a valve member having a wedge-shaped flow controlling portion with opposite faces which are in oblique relation to each other, said valve member being located in the plane of said gap, and means for moving said valve member in said plane to bring the opposite faces of the valve member against said inner edges of the collars to force said collars from their neutral position to a seating position with the faces of the valve member circumferentially engaging their respectively confronting inner edges of the collars.

2. The line blind of claim 1 wherein said mounting portions have annular convex surfaces having centers which lie approximately on the axis of said flow passage, and wherein said collars have inner sockets complementarily fitted around said surfaces.

3. The line blind of claim 1 wherein said valve member includes a pair of said flow controlling portions interconnected by an intermediate portion with the faces of each flow controlling portion diverging outward from said intermediate portion.

4. The line blind of claim 1 including means mounting said valve member and said moving means on said conduit means.

5. The line blind of claim 4 wherein said mounting means is adjustable relative to said conduit means to selectively orient the path of movement of the valve member in said plane.

6. A line blind comprising first and second axially aligned conduit sections defining a common axial flow passage therethrough and having annular end edges in axially spaced relation to each other, said sections also having mounting portions providing convex surfaces which have centers located substantially on the axis of said flow passage; first and second collars individually circumscribing said conduit sections and having sockets complementarily receiving said mounting portions, said collars having annular inner edges and being swivelable on said mounting portions for movement between a neutral position with said inner edges substantially parallel to each other and a plurality of seating positions with said inner edges displaced from said parallel relation, each collar having an annular camming rib adjacent to its inner edge, each collar including annular front and rear segments cooperating to retain said collar on its mounting portion, said segments having outwardly projecting mating flanges which are releasably interconnected to facilitate installation and removal of said collar on and from its mounting portion; means establishing a circumferential seal between each socket and its corresponding convex surface; a frame; means mounting the frame on said conduit sections for angular adjustment about the axis of said flow passage; a valve member including an intermediate portion and a pair of wedge-shaped flow controlling portions connected to and projecting in opposite directions from said intermediate portion, said flow controlling portions having opposite faces which are in oblique relation to each other and which diverge outward from said intermediate portion; and means mounting said valve member in said frame for rectilinear movement of the valve member between said end edges of the conduit sections in either direction from a neutral position in which said opposite faces are angularly related to said inner edges of the collars to a seating position with the opposite faces of one of said flow controlling forcing said collars to swivel on said mounting portions in order to move said collars into one of their seating positions whereupon said inner edges of the collars are in circumferential engagement with the opposite faces of said one flow controlling portion, said flow controlling portions engaging said camming lips during their movement into seating position; and means establishing a seal between each face of the valve member and its circumferentially engaged inner edge of the collars.

References Cited
UNITED STATES PATENTS

| | | | |
|---|---|---|---|
| 1,942,232 | 1/1934 | Alviset | 137—595 X |
| 2,728,349 | 12/1955 | Smith-Peterson et al. | 251—202 X |
| 2,800,926 | 7/1957 | Handley | 138—44 X |
| 3,152,786 | 10/1964 | Soderberg et al. | 251—167 |

LEVERNE D. GEIGER, *Primary Examiner.*

B. E. KILE, *Assistant Examiner.*